Patented Mar. 8, 1938

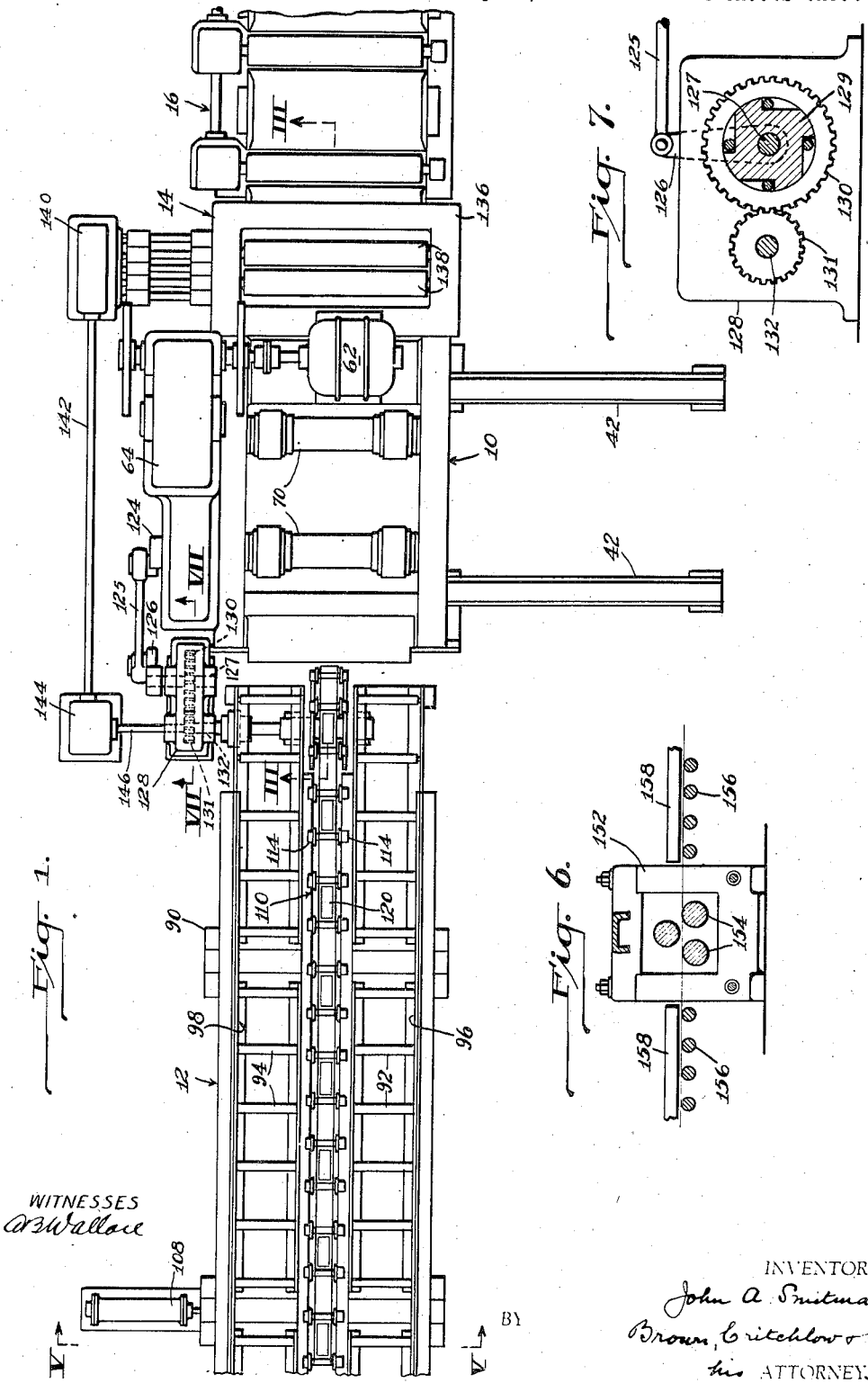

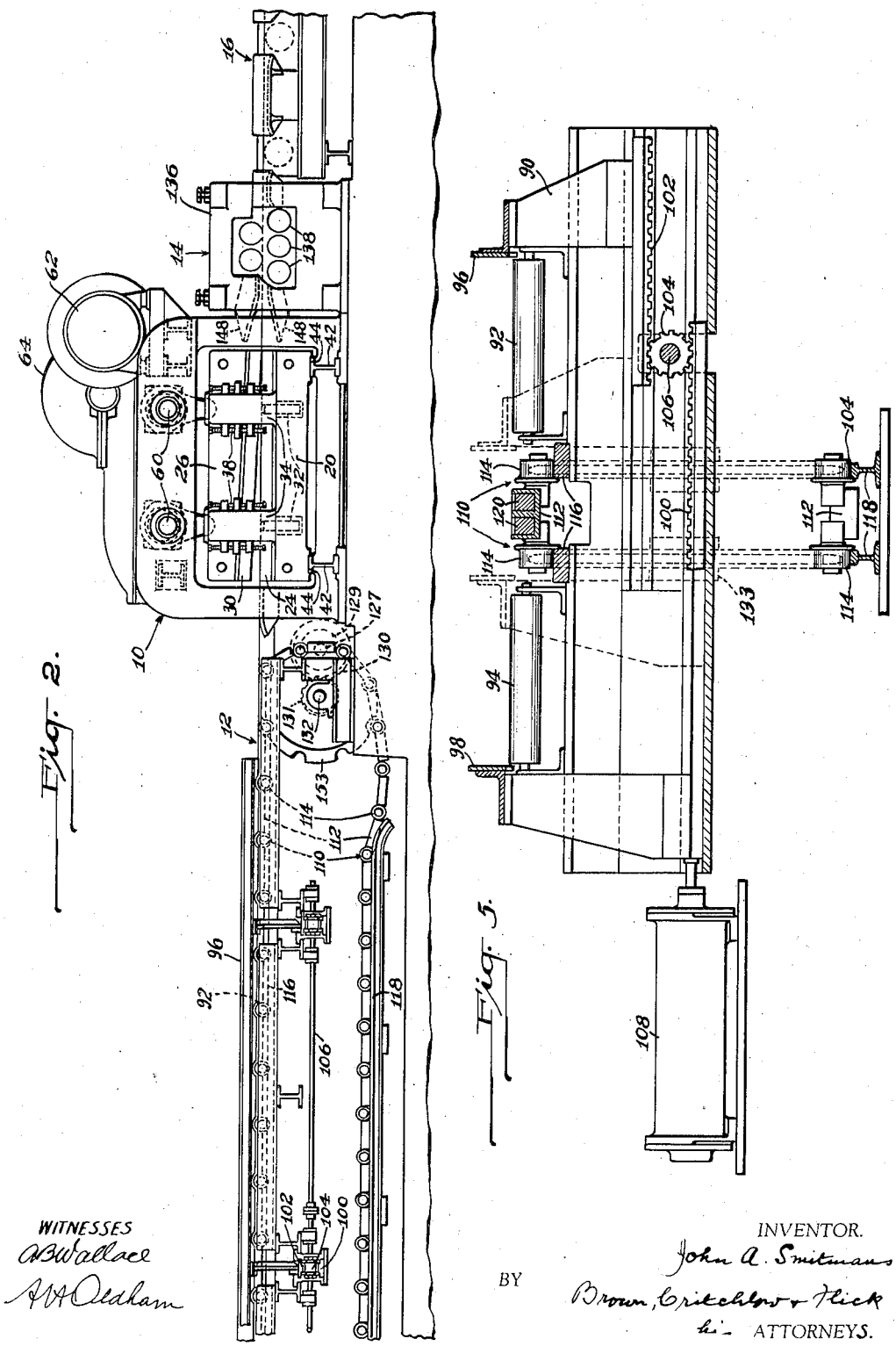

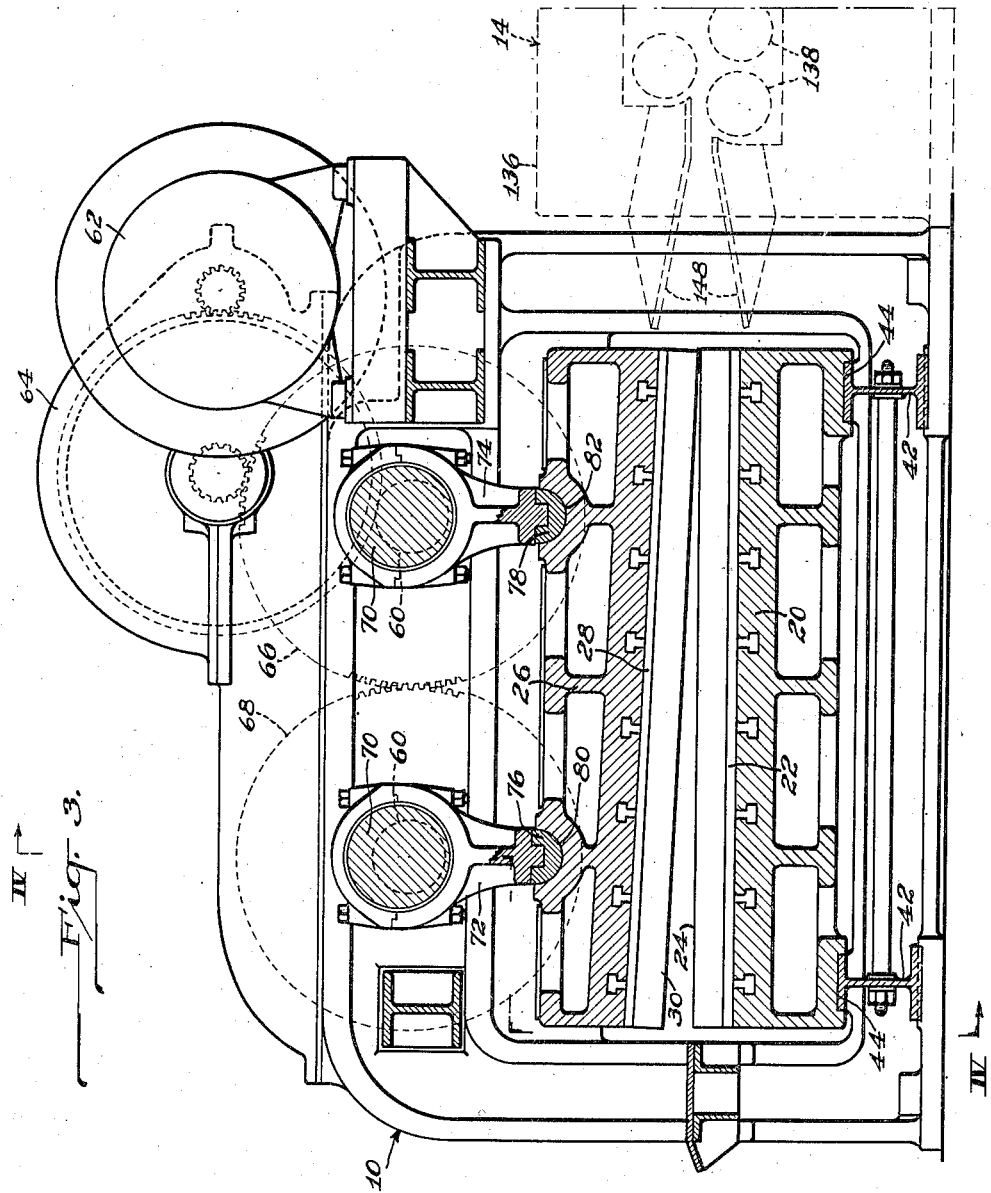

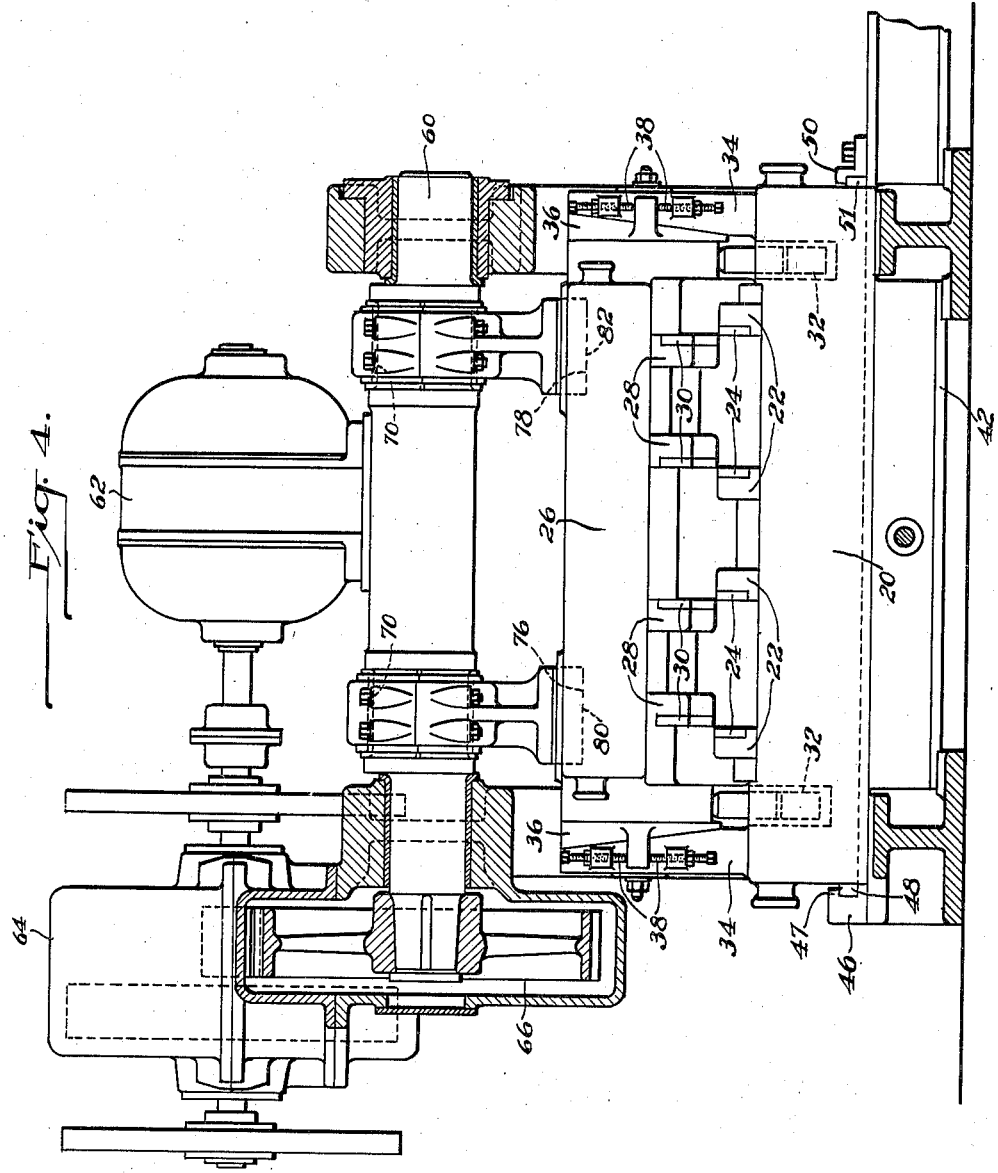

2,110,776

UNITED STATES PATENT OFFICE 2,110,776

GANG SLITTING SHEAR

John A. Smitmans, Pittsburgh, Pa., assignor to United Engineering & Foundry Company, Pittsburgh, Pa., a corporation of Pennsylvania Application May 22, 1936, Serial No. 81,245

14 Claims. (Cl. 164—48)

This invention relates to apparatus for shearing metal and more particularly is concerned with mechanism for gang slitting metal strip and sheet into a plurality of relatively narrow bands.

In the manufacture of metal ties or bands it is a relatively simple operation to pass wide metal strip or sheet through a gang slitter to cut the metal into a plurality of narrow bands as long as the metal cut is not greater than about $\frac{1}{16}$ inch in thickness. When it becomes necessary or advisable to form bands of thicker sheet or strip metal the usual slitting apparatus, which comprises a plurality of mating shearing discs mounted on common shafts above and below the metal, operates only with considerable deformation of the sheared bands. This is chiefly due to the fact that during shearing the metal is pushed down to the side of at least one of each pair of cooperating shearing discs so that the edges of the band are rough and uneven and so that often the plane of the severed band curves with the curvature of one of the shearing discs or twists so that ready coiling of the shear bands is rendered difficult.

Biggert Patent No. 1,819,635 discloses metal strip shearing apparatus which overcomes many of the objections to prior known disc-type strip shears in that relatively heavy gauge strip can be edge-trimmed without undesirable roughening or crimping of the resulting strip. The apparatus comprises the combination of large and small diameter shearing discs in each mating pair and the discs are so positioned that the portion of the strip engaged by the small diameter disc is the scrap edge which may curl away or be deformed without objection. This type of apparatus is primarily adapted for edge trimming strip.

In the operation of former types of metal slitting apparatus adjustment of the slitting shears and removal for sharpening or replacement by shears of different spacing were relatively slow and tedious and meant that the operation of the shear was interrupted for substantial periods. Furthermore, in prior shearing mechanism the strip or sheet metal cut was apt to twist out of proper shearing alignment and thereby presented difficulties in handling before shearing and other complications in straightening, coiling, or handling the severed metal portions.

It is the general object of my invention to avoid and overcome the foregoing and other difficulties of known types of metal strip shearing apparatus by the provision of an improved shear adapted to slit relatively thick metal strip into a plurality of narrow bands without deformation of the sheared edges or buckling of the bands.

Another object of my invention is to provide apparatus of the character described which is rugged, foolproof and easily operated and which is relatively inexpensive to manufacture, maintain and operate.

Another object of the invention is to provide mechanism for shearing metal strip wherein the shear blades can be quickly and easily removed as a unit and replaced with another unit or readily adjusted and replaced in the apparatus. Another object of my invention is the provision of an improved apparatus for shearing metal strip and the like wherein means are included for handling the metal before, during and after the shearing operation.

The foregoing and other objects of my invention are achieved by apparatus comprising a housing, a lower blade block, an upper blade block, and means removably mounting the blocks as a unit in the housing so that they may be slid out laterally thereof. A plurality of pairs of cooperating shear blades are mounted in the upper and lower blade blocks with means resiliently holding the blade blocks apart. Incorporated in the structure are one or more means for forcing the blade blocks together and thus the shear blades together with a shearing action. Further means are provided for feeding the metal strip to the shear blades and for pulling the slit strips therefrom with means for providing a dwell in the operation of the feeding and pulling means during substantially the time the shear blades are cutting the strip.

In the accompanying drawings Fig. 1 is a plan view of an apparatus incorporating the principles of my invention; Fig. 2 is a side elevation of the apparatus shown in Fig. 1; Fig. 3 is a cross-sectional view taken on line III—III of Fig. 1, but on a somewhat larger scale; Fig. 4 is a vertical cross-sectional view taken on line IV—IV of Fig. 3; Fig. 5 is a vertical cross-sectional view taken on line V—V of Fig. 1; Fig. 6 is a longitudinal vertical sectional view of a modified form of strip feeding apparatus; and Fig. 7 is a vertical cross-sectional view taken on line VII—VII of Fig. 1.

As best seen in Figs. 1 and 2, the particular embodiment of my invention illustrated includes a shear housing 10 which is in alignment with a feed-in conveyor 12, straightening and pull-out rolls 14 and a run-out conveyor 16. As shown in Figs. 3 and 4, positioned in the housing 10 is a bottom blade block 20 which adjustably mounts a plurality of blade-carrying brackets 22 each removably supporting a shear blade 24. Mounted on top of the lower bearing block 20 is an upper blade block 26 which adjustably carries a plurality of brackets 28 each removably carrying a shear blade 30 in alignment with the shear blades 24 of the lower bearing block. The blade blocks 20 and 26 are held resiliently apart by means such as fluid motors 32 and the lower block 20 carries vertically extending guides 34 which slidably engage the ends of the upper blade block 26. The guides 34 preferably include wedges 36 positioned by adjusting screws 38 whereby the width of the guides 34 for the upper blade block 26 can be controlled.

The lower and upper blade blocks and their associated structure comprise a unit which can be readily removed from the shear housing 10. In the form of the invention illustrated, this is achieved by providing transverse beams 42 in the housing which are received in slots 44 formed in the lower portion of the lower blade block 20, as best seen in Fig. 3. To limit the lateral position of the unit in the housing frame a stop 46 is provided on the housing at the ends of the beams 42, which stop may have a flange 47 that extends vertically above rib 48 formed on the side of the lower blade block to thereby hold the block against vertical movement. A removable clamp 50 is provided at the other side of the unit and engages with a rib 51 formed on the lower blade block 20. It will be seen that by removing the clamp 50 the blade unit can be removed laterally from the housing as hereafter more fully described.

The mechanism for reciprocating the upper blade block 26 toward and from the lower blade block 20 preferably comprises a plurality of shafts 60 journalled at their ends in the housing 10 and driven by a motor 62 through a gear box 64 and gears 66 and 68 carried by the shafts 60. Each of the shafts 60 is formed with an eccentric or crank portion 70 which carries connecting rods 72 and 74. The connecting rods are provided with rounded bearings 76 and 78 at their ends which are received in semi-cylindrical sockets 80 and 82 formed on the top of the upper blade block 26. Operation of the motor 62 effects reciprocating movement of the upper blade block 26 to and from the lower blade block 20 against the action of the fluid motors 32.

Incorporated in the apparatus is suitable mechanism for positively guiding and feeding metal strip to the shear. In the form of the invention shown this mechanism comprises a magnetic conveyor which has been indicated generally by the numeral 12. More specifically, the conveyor includes a base 90 supporting two lines of idler rollers 92 and 94 and side guards 96 and 98. The position of the side guards may be adjustable if desired through the provision of racks 100 and 102 which engage with opposite sides of a plurality of pinions 104 carried on a shaft 106. One or more fluid motors 108 are connected to racks 100 which are secured to the side guard 98, and inward movement of the side guard over the rollers 94 effects inward movement of the side guard 96 over the rollers 92 through the agency of pinions 104 and racks 102 secured to the side guard 96. In this manner the side guards can be moved to any position over the rollers 92 and 94, as for example, to the dotted line position shown in Fig. 5, to thereby effect accurate guiding movement of metal strip of any width carried by the conveyor.

Positioned between the idler rollers 92 and 94 is the magnetic strip-feeding means which includes a pair of endless spaced chains 110 which carry at regular distances boxes 112 upon which are journalled rollers 114. The rollers 114 are carried upon tracks 116 in the upper stretch of the chains and upon rails 118 in the return or bottom stretch of the chains. The boxes 112 contain magnets 120 which when carried in the upper stretch of the chains are so positioned that the magnets are substantially level with the top of the rollers 92 and 94. Thus any strip carried by the rollers and positioned between the side guards is magnetically gripped by the magnets 120 and is fed into the shear when the chains 110 are driven. The drive to the chains 110 is illustrated in Fig. 1 and includes a relatively short crank 124 connected to the gear box 64 of the drive for reciprocating the shear blades. Pivotally secured to the end of the crank 124 is a connecting rod 125 which is connected to the end of a relatively long arm 126 secured to a shaft 127 journalled in a gear box 128. The shaft 127 carries an overrunning ball clutch 129, as seen in Fig. 7, which drives, in one direction, a gear 130 meshing with a gear 131 secured to a shaft 132. The shaft 132 extends from the gear box and drives sprockets 133 around which the chains 110 extend.

In the operation of the conveyor drive the continuous reciprocating movement of the shear blades as effected by the motor 62 results in a discontinuous or intermittent movement of the conveyor due to the fact that the continuous rotary movement of the crank arm 124 merely oscillates the longer arm 126. The oscillations of the arm 126 through the action of the overrunning clutch in the gear box 128 provide a forward step-by-step movement of the conveyor. The arrangement of parts is such that the conveyor periodically drives the strip forward a distance slightly less than the length of the shear blades at a time when the blades are apart. Once the shear blades start coming together the crank 124 starts on its return stroke or swing through 180° and causes the overrunning clutch to back up and the conveyor drive stops. When the strip has been sheared and the blades have moved apart the return movement of the crank 124 again causes the conveyor to drive the strip into the shear for another bite.

The straightener and strip-removing means, indicated as a whole by the numeral 14, include a housing 136 mounting a plurality of rolls 138 which are intermittently driven in unison with the conveyor 12 through the agency of a gear box 140, shaft 142, gear box 144, and shaft 146 extending to the gear box 128. The housing 136 includes guides 148 for directing the strip from the shear to the rolls 138. From the straightening and pulling mechanism 14 the sheared strip passes to the conveyor 16 which is of any known type.

Fig. 6 illustrates a modified form of mechanism for feeding the strip to the shear including a housing 152 journalling a plurality of rolls 154 which are intermittently driven from the gear box 128 in the same manner as the conveyor 12. A conveyor 156 of any known type may be incorporated with the side of the feeding mechanism remote from the shear, and side guards 158 of similar construction to those shown in conjunction with the conveyor 12, and above described, may be included in the modified feeding mechanism to assist in accurately guiding the strip into the shear.

From the foregoing description it is believed that the operation of the apparatus will be evident. Briefly summarizing, however, the metal strip is fed into the shear by the conveyor 12 with an intermittent or stepped movement while the shear blades are ordinarily continuously reciprocated toward and from each other. The first cut of the shear blades severs the strip end into a plurality of bands or narrower strips and the upper shear blade then rises under the influence of the fluid motors 32 at which time the conveyor 12 again operates to move another length of strip below the shear. The shear blades 30 and 24 preferably do not entirely separate at one end of the shear, so that the position of the strip with respect to the shear blades is maintained with the forward feeding movement of the strip moving the uncut portion of the strip substantially up against the overlapping portions of the shear blades 24 and 30. The next downward movement of the shear cuts another length of the strip and during the shearing action, as will be understood, the conveyor 12 and the metal strip are stationary. As soon as the strip end has been fed through the shear the pull-out rolls 138 engage with the slitted ends and assist the conveyor 12 in moving the strip through the shear. The rolls 138 also function to straighten the strip and eliminate any possible irregularities therein. The continued operation of motor 62, the continuous reciprocation of the shear blades, and the intermittent movement of the conveyor 12 and straightening rolls 138 rapidly and substantially automatically effect the desired slitting action.

If it becomes necessary to readjust the lateral relation of the shear blades 30, as for example to cut narrower bands, the clamp 50 is removed and the entire blade unit is readily pulled from the side of the shear housing and another unit of the proper setting substituted. Or if desired the original shear unit can have the shear blades replaced, re-sharpened or adjusted with an ease and simplicity and a saving of time heretofore unknown.

From the foregoing it will be evident that the objects of my invention have been achieved by the provision of a rugged, simple and easily operated apparatus for shearing heavy sheet and strip metal into narrow bands or strips in a substantially automatic and commercially satisfactory manner. Crimping and roughness of the strip edges are entirely overcome. The apparatus adapts itself to rapid changes in the type and width of the strips cut. Original, maintenance and operating costs are relatively low, and losses of production time by replacement of shear blades, adjustment of cutting width, etc. are substantially eliminated.

While in accordance with the patent statutes one embodiment of my invention has been illustrated and described in detail, it should be appreciated that the invention is not limited thereto or thereby but is defined in the appended claims.

I claim:

1. A shear for gang slitting metal strip and the like, comprising a housing, a lower blade block and an upper blade block, means removably mounting the blocks as a unit in the housing so that they may be slid out laterally of the housing, a plurality of pairs of cooperating shear blades mounted in the upper and lower blade blocks, means resiliently holding the blade blocks apart, a plurality of means for forcing the blade blocks together and bringing the shear blades together with a shearing action, means for feeding strip to the shear blades, means for pulling the slit strips from the shear blades, and means for providing a dwell in the operation of the feeding and pulling means during substantially the time the shear blades are cutting the strip.

2. A shear for gang slitting heavy metal strip and the like into a plurality of long narrow strips by longitudinal cutting, comprising a housing, a lower blade block and an upper blade block, a plurality of pairs of cooperating shear blades mounted in the upper and lower blade blocks and extending longitudinally of the strip, means resiliently holding the blade blocks apart, a plurality of means for forcing the blade blocks together and bringing the shear blades together with a shearing action, means for feeding strip to the shear blades in a direction longitudinally of the blades and strip, means for pulling the slit strips from the shear blades, and means for providing a dwell in the operation of the feeding and pulling means during substantially the time the shear blades are cutting the strip.

3. A shear for longitudinally slitting metal strip and the like of relatively heavy gauge into a plurality of narrower strips, comprising a housing, a lower blade block and an upper blade block, a plurality of pairs of cooperating shear blades mounted in the upper and lower blade blocks and extending longitudinally thereof and the strip, means for reciprocating the blade blocks to and from each other to repeatedly bring the shear blades together with a shearing action, means for feeding strip to the shear blades, means for pulling the plurality of longitudinally slit strips from the shear blades, and means for providing a dwell in the operation of the feeding and pulling means during substantially the time the shear blades are cutting the strip.

4. A shear for cutting metal strip and the like, comprising a housing, a lower blade block and an upper blade block, means removably mounting the blocks as a unit in the housing so that they may be slid out laterally of the housing, a plurality of pairs of cooperating shear blades mounted in the upper and lower blade blocks, means resiliently holding the blade blocks apart, and means for forcing the blade blocks together and bringing the shear blades together with a shearing action.

5. A shear for cutting metal strip and the like, comprising a housing, a lower blade block and an upper blade block, means removably mounting the blocks as a unit in the housing so that they may be slid out laterally of the housing, a plurality of pairs of cooperating shear blades mounted in the upper and lower blade blocks, and means for forcing the blade blocks together and bringing the shear blades together with a shearing action.

6. A shear for longitudinally separating metal strip and the like into a plurality of narrower strips, comprising a housing, a lower blade block and an upper blade block carried by the housing, a pair of cooperating shear blades mounted in the upper and lower blade blocks and extending parallel to the direction of movement of the strip, means for moving the blade blocks to and from each other and bringing the shear blades together with a shearing action, means for pulling the slit strips from the shear blades, and means for providing a dwell in the operation of the pulling means during substantially the time the shear blades are cutting the strip.

7. A shear for metal strip and the like, comprising a housing having a lateral opening, a lower blade block and an upper blade block, a pair of cooperating shear blades mounted in the upper and lower blade blocks, means removably mounting the blocks as a unit in the housing so that they may be slid out the lateral opening of the housing, and means normally permanently associated with the housing for moving the blade blocks and blades to and from each other to effect a shearing action.

8. A shear comprising a housing, a lower blade block, an upper blade block, adjustable guides carried by one blade block and mounting the other blade block for sliding movement to and from the guide-carrying blade block, blade-carrying brackets adjustably secured to the blocks, blades removably mounted on the brackets to form at least one pair of mating shear blades, means for reciprocating the blade blocks to and from each other, means removably mounting the blade blocks, brackets and blades as a unit in the housing and making possible the removal of the unit to facilitate blade adjustments or replacement.

9. A shear comprising a housing, a lower blade block, an upper blade block, adjustable guides carried by one blade block and mounting the other blade block for sliding movement to and from the guide-carrying blade block, blade-carrying brackets adjustably secured to the blocks, blades removably mounted on the brackets to form at least one pair of mating shear blades, and means for reciprocating the blade blocks to and from each other.

10. In combination, a shear comprising blades movable to and from shearing relation, means for supplying strip material to the shear, simultaneously adjustable guides associated with the strip-supplying means and engaging with the edges of the strip material, means for gripping and pulling the strip material from the shear, a motor for moving the blades to effect a shearing operation, and mechanism connected to the motor and to the strip-supplying and pulling means for moving the strip material through the shear substantially only when the shear blades have just completed a cut and until they are ready to make another cut.

11. In combination, a shear comprising blades movable to and from shearing relation, magnetic means for supplying strip material to the shear in a direction parallel to the blades, means for gripping and pulling the strip material from the shear, a motor for moving the blades to effect a shearing operation, and mechanism connected to the motor and to the strip-supplying and pulling means for moving the strip material through the shear substantially only when the shear blades have just completed a cut and until they are ready to make another cut.

12. In combination, a shear for longitudinally cutting relatively heavy metal strip comprising blades movable to and from shearing relation, means for pulling the strip from the shear in a direction parallel to the blades, a motor for moving the blades to effect a shearing operation, and mechanism connected to the motor and to the strip-pulling means for moving the strip through the shear substantially only as the shear blades move apart, said mechanism including means for causing a dwell in the movement of the strip as the shear blades are moved together.

13. A gang slitting shear for longitudinally cutting relatively heavy metal strip comprising a plurality of pairs of cooperating blades, means reciprocating the blades to and from each other, and means for feeding metal strip through the blades in a direction parallel to the blades in stepped movements.

14. A shear comprising in combination a fixed blade, a supporting block for the fixed blade, a movable blade cooperating with the fixed blade, a supporting block for the movable blade, power means for only moving the blades together to shear, and resilient means positioned between the blocks for moving the blades apart the full length of the power stroke.

JOHN A. SMITMANS.